United States Patent Office 3,642,934
Patented Feb. 15, 1972

3,642,934
HEPTENE RECOVERY PROCESS
Michael J. Fulham, Quebec, Quebec, Canada, Richard Jones and Michael Webb, Southampton, England, and Jacques Hamard, Rixensart, Belgium, assignors to Esso Research and Engineering Company
Filed July 5, 1968, Ser. No. 744,616
Claims priority, application Great Britain, July 7, 1967, 31,377/67
Int. Cl. C07c 3/16, 5/24
U.S. Cl. 260—683.15 C                10 Claims

ABSTRACT OF THE DISCLOSURE $C_5$ to $C_8$ olefins are passed over an acidic, e.g., phosphoric acid, catalyst at temperatures ranging from 300 to 500° F. to effect isomerization and then subjecting the isomerized product to fractional distillation to separate heptenes from the product.

The present invention concerns an improved process for the recovery of heptenes from mixtures of $C_5$ to $C_8$ olefins. More particularly, this invention relates to a process for increasing the yield and improving the quality of the heptenes recoverable from olefin mixtures made by the UOP polymerization of propylene and butylene.

It is well known that the polymerization of propylene and butylene by the so-called UOP process under the action of a phosphoric acid-containing catalyst results in the formation of olefins, from which pure heptenes can be recovered.

The conventional UOP process for making heptenes involves polymerizing a mixture of propylene with n-butylene and iso-butylene, removing from the polymer the $C_3$ and $C_4$ hydrocarbons by fractionation in a plurality of distillation towers, passing the remaining polymer, rich in $C_5$ to $C_8$ olefins, to another distillation tower commonly referred to as "dehexenizer" to obtain dehexenizer overheads made up of $C_4$ to $C_7$ hydrocarbons and dehexenizer bottoms containing $C_7$ and $C_8$ olefins, and subjecting the dehexenizer bottoms to fractionation in a further distillation tower commonly referred to as "deheptenizer" to separate the mixture into an overhead stream consisting essentially of high-quality heptenes and a bottom stream containing heptenes, octenes and small amounts of higher olefins.

Figure 1:
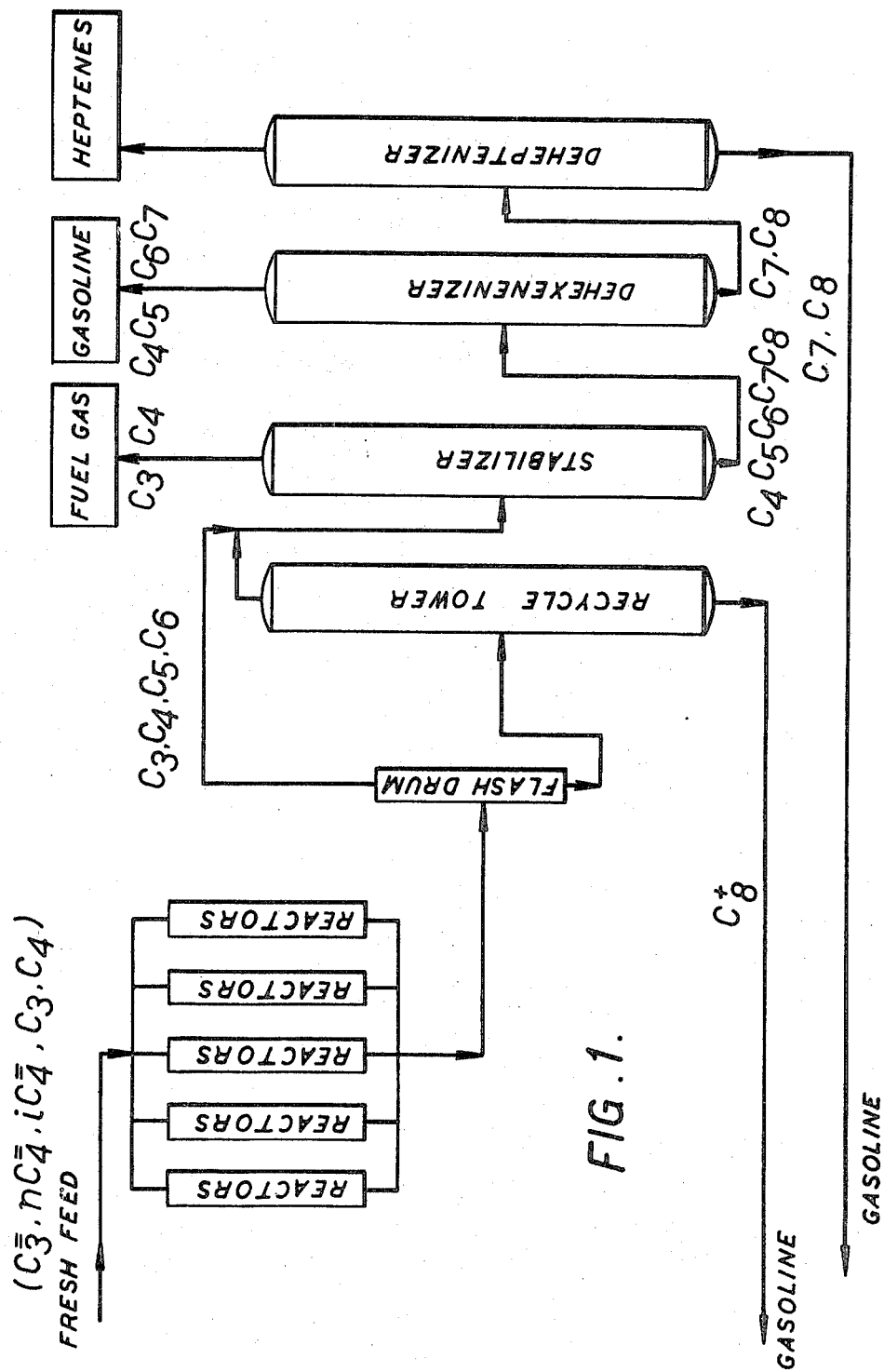

FIG. 1 of the accompanying drawings is a flow plan representing diagammatically a specific embodiment of the above process as carried out in the heptene plant of an oil refinery.

The recovery of the heptenes contained in the dehexenizer overheads and deheptenizer bottoms referred to above presents difficulties since they include isomers whose boiling points are close to those of some of the accompanying lower and higher olefins. Thus, a large proportion of the heptenes present in the dehexenizer overheads are low boiling isomers difficult to separate from some of the hexene isomers also contained in this stream while the deheptenizer bottoms contain a large proportion of heptene isomers boiling close to some of the accompanying octenes.

Apart from these separation difficulties, the heptenes contained in the dehexenizer overheads and deheptenizer bottoms are generally of lower quality due to the presence of relatively large amounts of branched isomers unsuitable for use in some chemical reactions.

It has now been found in accordance with the present invention that high-quality heptenes can be recovered from $C_5$ to $C_8$ olefin mixtures by a 2-step process which comperature within the range of 300° to 500° F. to effect isomerization and subjecting the isomerization product to erization and subjecting the isomerization product to fractional distillation to separate pure heptenes from olefins of lower and higher carbon chain lengths.

The isomerization step is preferably carried out at a pressure of 100 to 1,000 p.s.i. The space velocity may vary within wide limits, depending upon the activity of the catalyst.

Although a great variety of acidic catalysts are suitable for use in the practice of the invention a phosphoric acid comprising catalyst, e.g. kieselguhr impregnated with phosphoric acid is generally preferred because this type of catalyst gives particularly good results. Under the conditions of temperature and pressure specified above, kieselguhr impregnated with phosphoric acid catalysts permit space velocities of 0.1 to 2.0 U.S. gallons of liquid feed per hour per pound of catalyst (U.S.G.H./LB.).

In order to maintain the activity of the acidic catalyst comprising phosphoric acid, such as phosphoric acid on kieselguhr, it is advisable to charge the olefin feed with water vapour before contact with the catalyst. Injection of water into the feed or contacting the feed with water at elevated temperature represent convenient means to product the desired degree of humidity. At the temperatures used in the process of the invention inactivation of the catalyst due to a gradual dehydration of the phosphoric acid contained therein would be caused by a dry feed being passed over the catalyst for long periods of time.

The distillation step is preferably carried out in 2 distillation towers having the required numbers of plates. Thus, the isomerization product may be fed to a tray near the middle of a first tower having a total of 30 to 50 trays and being operated at a reflux ratio of between 3:1 and 5:1.

The bottoms of the first tower, rich in heptenes, may be passed to the middle section of a second distillation tower having 40 to 60 trays and being operated under similar conditions (i.e. a reflux ratio of between 3:1 and 5:1) to obtain an overhead stream consisting essentially of pure heptenes.

Although the process of the invention can be applied to any suitable mixtures of olefins, particular benefits are obtained if the above-mentioned dehexenizer overheads and/ or deheptenizer bottoms are treated in accordance with the present invention. Whereas a simple redistillation of these streams results in unsatisfactory yields of low-quality heptenes for the reasons stated above, the process of the invention makes it possible to recover large quantities of high-grade heptenes from these fractions.

It has been found that the heptenes contained in the dehexenizer overheads and deheptenizer bottoms (especially a blend of about 60 wt. percent of the dehexenizer overheads and about 40 wt. percent of the dehepenizer bottoms) are isomerized under the action of the acidic catalysts used in the practice of the invention with the formation of isomers which can be separated more easily from the accompanying $C_6$ and/or $C_8$ olefins. Moreover the composition of the isomer mixtures formed is such as to make them more suitable for use in some chemical reactions.

Therefore, the present invention is particularly useful in the recovery of heptenes from the above mentioned distillation products of UOP polymers.

Figure 2:
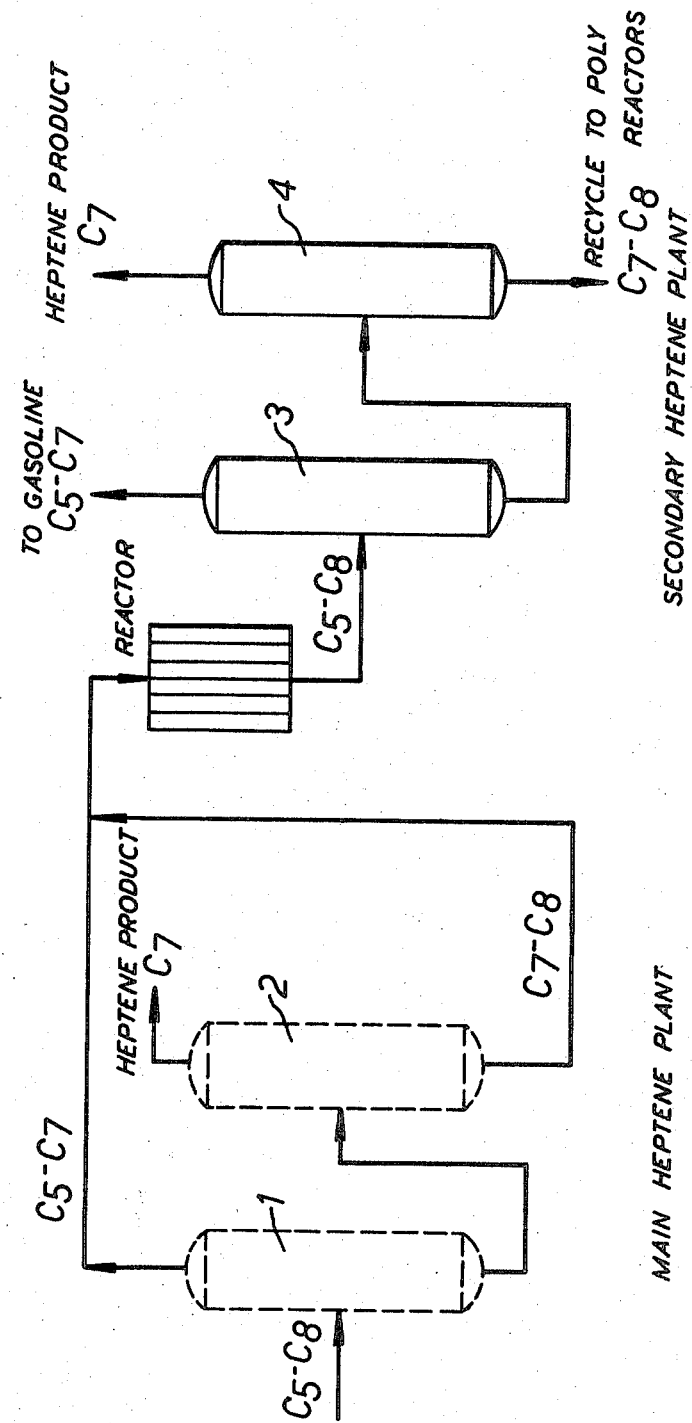

FIG. 2 of the accompanying drawings shows the application of the invention to a $C_5$ to $C_8$ olefin mixture produced by UOP polymerization of propylene and butylene as described above.

Referring more particularly to FIG. 2, numeral 1 designates the dehexenizer of the main heptene plant. The dehexenizer is a distillation tower having about 40 theoretical plates which is operated at a pressure of 22 p.s.i.g. and a reflux ratio of 4:1. The feed is introduced at a point near the middle of the tower and contains a $C_5$ to $C_8$ olefin mixture produced by UOP polymerization of propylene and butylene as described above and shown diagramatically in FIG. 1.

The bottoms of dehexenizer 1 are fed to the central portion of distillation tower 2, which functions as the deheptenizer of the main heptene plant. This tower has about 50 theoretical plates. Conditions of operation include a pressure of 3 p.s.i.g. and a reflux ratio of 4:1. Pure heptenes are taken off as the deheptenizer overheads.

In accordance with the present invention, the top fraction of tower 1 referred to as "dehexenizer overheads," and the bottom fraction of tower 2, referred to as "deheptenizer bottoms," are isomerized, either separately or jointly, and an additional amount of high-quality heptenes is recovered from the isomerization product by fractional distillation.

In the specific embodiment of the invention shown in FIG. 2, the dehexenizer overheads and the deheptenizer bottoms, formerly added to the gasoline pool of the refinery, are passed jointly to an isomerization reactor where they are contacted with an acidic catalyst, preferably kieselguhr impregnated with phosphoric acid, under the conditions specified above. The product leaving the isomerization reactor enters the middle portion of dehexenizer 3 which together with deheptenizer 4 is part of the secondary heptene plant. Design and operation of these two distillation towers are substantially the same as those of towers 1 and 2. The bottoms of dehexenizer 3 are fed to a tray near the middle of deheptenizer 4 where they are separated into pure heptene product (top fraction) and a mixture of higher-boiling olefins (bottoms) which may be recycled to the UOP polymerization reactor shown in FIG. 1.

A detailed study of the reactions occurring in the process of the invention has shown why the isomerization step permits an increased recovery of high-quality heptenes.

In the first place, the isomerization results in a favourable shift of the boiling points due to the formation of lower and higher boiling heptene isomers. While the heptenes present in the dehexenizer overheads of the main heptene plant are isomerized to a mixture of heptenes containing a larger proportion of high boiling isomers, the heptenes present in the deheptenizer bottoms of the main heptene plant form a mixture of heptenes including a larger proportion of low-boiling isomers. This means that both the dehexenizer overheads and the deheptenizer bottoms are converted to fractions, from which larger proportions of heptenes can be separated by redistillation.

The beneficial effect of the isomerization on the recovery of the heptenes can be seen from the following yields obtained under various conditions in a heptene plant as represented in FIGS. 1 and 2.

Heptene recovered from the top of tower 2:34 units of weight per unit of time.
Heptene recovered from the top of tower 4:10 units of weight per unit of time.
Total heptene yield: 44 units of weight per unit of time.

In an experimental run, the isomerization reactor was by-passed and the mixture of dehexenizer overheads and deheptenizer bottoms was fed directly to distillation tower 3. Under these conditions, the heptene recovered from the top of tower 4 amounted only to 6 units of weight per unit of time. In other words, the total heptene yield dropped to 40 units of weight per unit of time.

Furthermore the isomerization leads to a decrease in the concentration of certain undesirable branched heptene isomers. At the same time the concentration of more desirable isomers having a higher degree of linearity is increased.

Mixtures of heptene isomers can be analyzed most readily by hydrogenation followed by gas chromatography of the hydrogenation product. The ratio of $$\frac{2,3 + 2,4 \text{ dimethyl pentanes}}{2 + 3 \text{ methyl hexanes}}$$

and the sum of 2,2+3,3 dimethyl pentanes
and 2,2,3 trimethyl butane found in the hydrogenation product provide convenient measures of the suitability of heptene mixtures for certain chemical reactions. It is known for example that in the production of oxo alcohols from heptenes, unsatisfactory products are obtained if the above ratio of dimethyl pentanes to methyl hexanes and the above sum of dimethyl pentanes and trimethyl butane are too high.

It is an important feature of the present invention that heptene mixtures having relatively high values of the above ratio and sum, such as the dehexenizer overheads of the main heptene plant or mixtures of this fraction with the deheptenizer bottoms of the main heptene plant, are converted to heptene mixtures characterized by relatively low values of these important parameters.

The following example illustrates the invention.

EXAMPLE

Three series of experiments were carried out, using a tubular reactor of a length of 6 feet and of an inner diameter of ¾ inch. The reactor was filled with UOP No. 2 catalyst representing kieselguhr impregnated with phosphoric acid (55–70 wt. percent phosphate measured as $P_2O_5$, remainder kieselguhr).

The feed consisted of the "dehexenizer overheads" (top fraction of tower 1 shown in FIG. 2), "deheptenizer bottoms" (bottom fraction of tower 2 shown in FIG. 2) or a blend of "dehexenizer overheads" and "deheptenizer bottoms."

To avoid an inactivation of the catalyst the feed was charged with water vapour (about 2,500 p.p.m.) by contact with water at 130° F. before being passed through the reactor.

The feeds used and isomerization products obtained were analyzed by gas chromatography.

Tables 1 and 2 shows the conditions and the results of the experiments involving the "dehexenizer overheads" while Tables 3 and 4 contain the experimental data on "deheptenizer bottoms" and a blend of this fraction with the "dehexenizer overheads."

TABLE 1

| | Feed | Run number | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Reactor inlet temperature, °F | | 346 | 339 | 380 | 352 | 398 | 432 | 352 | 318 | 383 | 394 | 394 | 398 | 379 | 377 |
| Reactor outlet temperature, °F | | 402 | 404 | 404 | 377 | 426 | 449 | 423 | 425 | 451 | 425 | 424 | 426 | 425 | 425 |
| Space velocity, USGH/lb | | 2 | 1 | 0.45 | 0.45 | 0.45 | 0.45 | 1 | 2 | 1 | 0.45 | 0.45 | 0.45 | 0.45 | 0.45 |
| Pressure, p.s.i | | 500 | 500 | 500 | 500 | 500 | 500 | 500 | 500 | 500 | 500 | 300 | 900 | 500 | 100 | 200 |
| Product composition: | | | | | | | | | | | | | | | |
| $C_7-$, weight percent | 48.5 | | 33.2 | 25.9 | 28.8 | 24.6 | 25.4 | 31.4 | 34.4 | 29.0 | 24.2 | 23.3 | 25.3 | 28.9 | 23.2 |
| Heptane | 51.3 | | 45.3 | 39.3 | 43.2 | 36.0 | 31.0 | 42.4 | 42.5 | 38.5 | 31.3 | 39.1 | 37.3 | 36.7 | 30.8 |
| $C_7+$ | 0.2 | | 21.5 | 34.8 | 28.0 | 39.4 | 43.6 | 26.2 | 23.1 | 32.5 | 44.5 | 37.6 | 37.4 | 34.4 | 46.0 |
| Heptene composition (after hydrogenation): | | | | | | | | | | | | | | | |
| 2-2 DMP, weight percent | 13.0 | 5.9 | 4.6 | 3.2 | 3.8 | 2.8 | 2.4 | 3.4 | 4.3 | 3.0 | 2.4 | 2.8 | 2.8 | 2.9 | 2.6 |
| 2-4 DMP | 46.0 | 39.1 | 36.0 | 29.5 | 34.4 | 25.2 | 21.5 | 31.4 | 34.2 | 26.3 | 22.7 | 26.0 | 26.1 | 24.0 | 23.2 |
| 2-2-3 TMB | 1.2 | 1.2 | 1.2 | 1.2 | 1.2 | 1.3 | 1.3 | 1.3 | 1.3 | 1.3 | 1.3 | 1.4 | 1.3 | 1.3 | 1.3 |
| 3-3 DMP | 1.2 | 0.5 | 0.4 | 0.2 | 0.3 | 0.3 | 0.3 | 0.3 | 0.4 | 0.4 | 0.3 | 0.3 | 0.3 | 0.3 | 0.3 |
| 2 MH | 6.0 | 6.8 | 7.2 | 9.1 | 7.2 | 11.6 | 15.1 | 8.5 | 7.6 | 11.4 | 13.6 | 10.9 | 11.0 | 13.8 | 14.2 |
| 2-3 DMP | 25.8 | 37.8 | 40.6 | 43.0 | 42.5 | 40.0 | 35.0 | 42.2 | 41.0 | 39.4 | 37.7 | 41.3 | 41.0 | 35.8 | 35.5 |
| 3 MH | 6.0 | 7.8 | 8.9 | 12.0 | 9.4 | 16.1 | 20.1 | 11.5 | 9.9 | 15.5 | 18.6 | 14.8 | 15.0 | 18.5 | 19.2 |
| 3 EP | 0.4 | 0.5 | 0.6 | 0.9 | 0.7 | 1.2 | 1.7 | 0.9 | 0.7 | 1.2 | 1.4 | 1.2 | 1.1 | 1.4 | 1.5 |
| $nC_7$ | 0.4 | 0.4 | 0.5 | 0.9 | 0.5 | 1.5 | 2.6 | 0.8 | 0.6 | 1.5 | 2.1 | 1.3 | 1.4 | 2.0 | 2.2 |
| Ratio, 2,3 plus 2,4 DMP/2 plus 3 MH | 6.0 | 5.3 | 4.75 | 3.45 | 4.65 | 2.35 | 1.60 | 3.65 | 4.30 | 2.45 | 1.85 | 2.60 | 2.60 | 1.85 | 1.75 |
| Sum, 2,2 plus 3,3 plus 2,2,3 | 15.4 | 7.6 | 6.2 | 4.6 | 5.3 | 4.4 | 4.0 | 5.0 | 6.0 | 4.7 | 3.9 | 4.5 | 4.4 | 4.5 | 4.2 |

TABLE 2.—DEHEXENIZER OVERHEAD ISOMERISATION COMPONENT ANALYSIS OF HEPTENES

| Isomers | Olefin type | B.P., °C. | Feed | Run | | | | |
|---|---|---|---|---|---|---|---|---|
| | | | | 2 | 5 | 7 | 9 | 14 |
| 4,4 dimethyl 1 pentene weight percent | 1 | 72.5 | 1.16 | | 0.26 | 0.23 | 0.12 | |
| Trans 4,4 dimethyl 2 pentene | 2 | 76.7 | 5.32 | 1.64 | 0.69 | 1.16 | 0.59 | 0.67 |
| 3,3 dimethyl 1 pentene | 1 | 77.5 | 2.65 | 1.76 | 0.75 | 1.22 | 1.01 | 1.00 |
| 2,3,3 trimethyl 1 butene | 3 | 77.9 | 0.52 | 0.37 | 0.23 | 0.36 | 0.83 | 0.26 |
| 2,4 dimethyl pentane | | 80.5 | 0.77 | 0.97 | 1.07 | 0.95 | 0.98 | 1.29 |
| 4,4 dimethyl cis 2 pentene | 2 | 80.4 | 0.07 | | 0.01 | 0.02 | 0.27 | |
| 3,4 dimethyl 1 pentene | 1 | 80.8 | 0.41 | 0.19 | | 0.15 | 0.98 | 0.09 |
| 2,4 dimethyl 1 pentene | 3 | 81.6 | 6.60 | 4.62 | 2.68 | 3.86 | 2.97 | 1.98 |
| Not identified | | | | | | | | |
| 2,4-dimethyl 2 pentene | 4 | 83.3 | 15.71 | 10.86 | 5.68 | 8.73 | 6.10 | 4.28 |
| 3 methyl 1 hexene | 1 | 83.9 | 0.12 | | 0.03 | 0.04 | | |
| 2 ethyl 1 pentene | 3 | 94.0 | 0.01 | | | | | |
| 2,3 dimethyl 1 pentene | 3 | 84.3 | 0.66 | 0.32 | 0.33 | 0.30 | 0.33 | 0.35 |
| 5 methyl 1 hexene | 1 | 85.3 | 4.00 | 2.16 | 1.73 | 2.13 | 1.80 | 1.25 |
| Cis 4 methyl 2 hexene | 2 | 86.3 | 0.25 | 0.10 | 0.12 | 0.12 | 0.13 | 0.12 |
| 4 methyl 1 hexene | 1 | 86.7 | | | | | | |
| Trans 4 methyl 2 hexene | 2 | 87.6 | 0.84 | 0.44 | 0.50 | 0.46 | 0.53 | 0.53 |
| 2 ethyl 3 methyl 1 butene | 3 | 86.4 | 1.60 | 1.11 | 1.02 | 1.11 | 1.03 | 0.83 |
| Trans 5 methyl 2 hexene | 2 | 88.1 | | | | | | |
| 2 methyl hexane | | 90.1 | 0.18 | 0.23 | 0.36 | 0.25 | 0.32 | 0.53 |
| Not identified | | | 0.16 | | 0.20 | 0.18 | 0.20 | |
| Trans 3,4 dimethyl 2 pentene | 4 | 91.5 | 1.90 | 2.29 | 2.13 | 2.10 | 2.02 | 2.36 |
| 2 methyl 1 hexene | 3 | 92.0 | 0.11 | 0.15 | 0.26 | 0.18 | 0.24 | 0.43 |
| Cis 3,4 dimethyl 2 pentene | 4 | 89.3 | 3.73 | 5.01 | 4.09 | 4.86 | 4.18 | 3.06 |
| 1 heptene | 1 | 93.6 | 0.10 | 0.19 | 0.28 | 0.22 | 0.29 | 0.29 |
| Not identified | | | 0.30 | 0.40 | 0.60 | 0.49 | 0.60 | 0.60 |
| Trans 3 methyl 3 hexene | 4 | 93.5 | 0.05 | 0.07 | 0.15 | 0.10 | 0.17 | 0.21 |
| Not identified | | | | | | | | 0.05 |
| Cis 3 methyl 3 hexene | 4 | 95.4 | 1.14 | 2.27 | 3.21 | 2.67 | 3.19 | 3.13 |
| 2 methyl 2 hexene | 4 | 95.2 | 0.36 | 0.35 | 0.92 | 0.78 | 0.93 | 0.94 |
| Not identified | | | | | | | | |
| Do | | | 0.08 | | | | | |
| 3 ethyl 2 pentene | 4 | 96.0 | 0.12 | 0.13 | 0.39 | 0.30 | 0.38 | 0.37 |
| Trans 2 heptene | 2 | 98.2 | | 0.04 | 0.15 | 0.08 | 0.14 | 0.19 |
| Cis 3 methyl 2 hexene | 4 | 97.3 | 0.38 | 1.02 | 1.50 | 1.23 | 1.46 | 1.47 |
| 2,3 dimethyl 2 pentene | 5 | 97.4 | 2.08 | 8.53 | 6.66 | 8.12 | 6.71 | 4.52 |

TABLE 3.—DEHEPTENIZER BOTTOM AND DEHEXENIZER OVERHEAD ISOMERIZATION

| | Deheptenizer bottom isomerization | | | | | Dehexenizer OH/deheptenizer bottom blend isomerization | | | |
|---|---|---|---|---|---|---|---|---|---|
| | Feed | Run number | | | | Feed | Run number | | |
| | | 17 | 18 | 19 | 20 | | 21 | 22 | 23 |
| Reactor inlet temperature, °F | | 386 | 350 | 335 | 406 | | 398 | 356 | 367 |
| Reactor outlet temperature, °F | | 426 | 425 | 402 | 425 | | 425 | 425 | 425 |
| Space velocity, USGH/lbs | | 0.45 | 1 | 1 | 0.45 | | 0.45 | 1 | 0.45 |
| Pressure, p.s.i | | 500 | 500 | 500 | 100 | | 500 | 500 | 100 |
| Product composition: | | | | | | | | | |
| $C_7-$, Weight percent | | 3.3 | 2.3 | 2.1 | 4.6 | 28.3 | 16.0 | 19.3 | 22.8 |
| Heptene | 39.7 | 27.7 | 33.5 | 34.8 | 25.2 | 48.0 | 32.8 | 39.6 | 31.3 |
| $C_7+$ | 60.3 | 69.0 | 64.2 | 63.1 | 70.2 | 23.7 | 51.2 | 41.1 | 45.9 |
| Heptene composition (after hydrogenation): | | | | | | | | | |
| 2-2 DMP | | 2.2 | 2.7 | 2.8 | 2.3 | 8.5 | 2.6 | 3.1 | 2.8 |
| 2-4 DMP | 0.2 | 14.4 | 12.3 | 9.9 | 15.1 | 30.2 | 21.4 | 24.7 | 22.1 |
| 2-2-3 TMB | | 0.4 | 0.2 | 0.2 | 0.4 | 1.0 | 1.0 | 0.9 | 1.0 |
| 3-3 DMP | | 0.2 | 0.3 | 0.3 | 0.2 | 0.8 | 0.5 | 0.3 | 0.3 |
| 2 MH | 11.4 | 17.1 | 14.7 | 13.6 | 18.8 | 7.6 | 13.2 | 10.5 | 15.0 |
| 2-3 DMP | 57.0 | 33.4 | 39.8 | 43.3 | 29.6 | 37.4 | 38.3 | 42.1 | 34.2 |
| 3 MH | 25.4 | 25.7 | 24.2 | 24.1 | 26.8 | 12.1 | 19.0 | 15.5 | 20.4 |
| 3 EP | 2.5 | 2.2 | 2.0 | 2.1 | 2.2 | 1.0 | 1.6 | 1.2 | 1.5 |
| $nC_7$ | 3.5 | 4.4 | 3.8 | 3.7 | 4.6 | 1.4 | 2.4 | 1.7 | 2.7 |
| Ratio: 2,3 plus 2,4 DMP/ 2 plus 3 MH | 1.55 | 1.11 | 1.34 | 1.41 | 0.98 | 3.43 | 1.85 | 2.57 | 1.59 |
| Sum; 2,2 plus 3,3 plus 2,2,3 | 0 | 2.8 | 3.2 | 3.3 | 2.9 | 10.3 | 4.1 | 4.3 | 4.1 |

TABLE 4.—DEHEPTENIZER BOTTOM ISOMERIZATION COMPONENT ANALYSIS OF HEPTENES

| Isomers | Olefin type | B.P., °C. | Feed | Run 17 | Run 18 | Run 19 | Run 20 |
|---|---|---|---|---|---|---|---|
| 4,4 dimethyl 1 pentene, weight percent | 1 | 72.5 | | | | | |
| Trans 4,4 dimethyl 2 pentene | 2 | 76.7 | | 0.52 | 0.76 | 0.82 | 0.47 |
| 3,3 dimethyl 1 pentene | 1 | 77.5 | | 0.27 | 0.11 | 0.10 | 0.10 |
| 2,3,3 trimethyl 1 butene | 3 | 77.9 | | 0.09 | 0.25 | 0.18 | 0.38 |
| 2,4 dimethyl pentane | | 80.5 | | 0.10 | 0.06 | 0.03 | 0.16 |
| 4,4 dimethyl cis 2 pentene | 2 | 80.4 | | | 0.10 | 0.02 | 0.07 |
| 3,4 dimethyl 1 pentene | 1 | 80.8 | | 0.08 | 0.01 | 0.10 | |
| 2,4 dimethyl 1 pentene | 3 | 81.6 | | 1.21 | 1.18 | 1.00 | 1.13 |
| Not identified | | | | | 0.04 | | |
| 2,4 dimethyl 2 pentene | 4 | 83.3 | | 2.86 | 2.81 | 2.54 | 2.72 |
| 3 methyl 1 hexene | 1 | 83.9 | | | | | |
| 2 ethyl 1 pentene | 3 | 94.0 | | | | | |
| 2,3 dimethyl 1 pentene | 3 | 84.3 | | 0.41 | 0.02 | 0.34 | |
| 5 methyl 1 hexene | 1 | 85.3 | | 1.13 | 2.04 | 1.89 | 1.39 |
| Cis 4 methyl 2 hexene | 2 | 86.3 | | 0.17 | 0.14 | 0.18 | 0.17 |
| 4 methyl 1 hexene | 1 | 86.7 | | | | | |
| Trans 4 methyl 2 hexene | 2 | 87.6 | | 0.68 | 0.68 | 0.70 | 0.67 |
| 2 ethyl 3 methyl 1 butene | 3 | 86.4 | | 0.89 | 0.97 | 0.53 | 0.84 |
| Trans 5 methyl 2 hexene | 2 | 88.1 | | | | 0.50 | |
| 2 methyl hexane | | 90.1 | | 0.24 | 0.11 | 0.10 | 0.30 |
| Not identified | | | | | 0.20 | 0.30 | |
| Trans 3,4 dimethyl 2 pentene | 4 | 91.5 | 0.53 | 1.44 | 1.38 | 1.38 | 1.37 |
| 2 methyl 1 hexene | 3 | 92.0 | 0.09 | 0.29 | 0.19 | 0.15 | 0.35 |
| Cis 3,4 dimethyl 2 pentene | 4 | 89.3 | 2.72 | 2.93 | 3.97 | 4.57 | 2.41 |
| 1 heptene | 1 | 93.6 | 0.21 | 0.39 | 0.41 | 0.46 | 0.37 |
| Not identified | | | 0.74 | 0.77 | 0.86 | 0.93 | 0.74 |
| Trans 3 methyl 3 hexene | 4 | 93.5 | 0.37 | 0.43 | 0.38 | 0.42 | 0.38 |
| Not identified | | | 0.10 | 0.09 | 0.09 | 0.07 | |
| Cis 3 methyl 3 hexene | 4 | 95.4 | 5.63 | 3.96 | 4.44 | 4.32 | 3.90 |
| 2 methyl 2 hexene | 4 | 95.2 | 2.98 | 1.41 | 2.66 | 1.85 | 1.03 |
| Not identified | | | | | | | |
| Do | | | 0.73 | 0.14 | 0.18 | 0.29 | 0.14 |
| 3 ethyl 2 pentene | 4 | 96.0 | 0.84 | 0.47 | 0.52 | 0.59 | 0.47 |
| Trans 2 heptene | 2 | 98.2 | 0.57 | 0.38 | 0.34 | 0.44 | 0.27 |
| Cis 3 methyl 2 hexene | 4 | 97.3 | 4.37 | 1.93 | 2.28 | 2.36 | 1.90 |
| 2,3 dimethyl 2 pentene | 5 | 97.4 | 19.92 | 4.41 | 6.32 | 7.62 | 3.40 |

It is apparent from the results set forth in Table 1 that the isomerization of the dehexenizer overheads leads to a product of improved quality. This is evidenced by the decreased ratio of $$\frac{2,3+2,4\text{-dimethyl pentanes}}{2+3 \text{ methyl hexanes}}$$

and the reduced sum of 2,2+3,3 dimethylpentanes and 2,2,3 trimethyl butane found in the hydrogenation products of the isomer mixtures produced in Runs 1–14.

Table 2 shows that as a result of the isomerization, the concentration of the low boiling heptene isomers decreases while the concentration of the high-boiling isomers increases. This means that the isomerization products can be separated more easily from the accompanying hexenes than the original dehexenizer overheads.

Table 3 shows that the quality of the deheptenizer bottoms (Runs 17–20) and of a blend of 60 wt. percent dehexenizer overheads with 40 wt. percent deheptenizer bottoms (Runs 21–23) is improved by isomerization. In either case the above-indicated ratio is decreased. The isomerization products of the blend are characterized also by a reduced sum of 2,2+3,3 dimethyl pentanes and 2,2,3 trimethyl butane in their hydrogenation products.

Table 4 shows the effect of the isomerization of the deheptenizer bottoms on their composition. While the feed contained no heptene isomer boiling below 88° C. the isomerization product contain 8–9% of heptene isomers with boiling point below 88° C. Owing to this shift in the isomer distribution, the isomerization product can be separated more readily from the accompanying octenes than the original deheptenizer bottoms.

What is claimed is:

1. An improved process for preparing heptenes characterized as having a high degree of linearity, which comprises (1) polymerizing a mixture comprising $C_3$ and $C_4$ olefins, (2) removing the $C_3$ and $C_4$ olefins from the polymer by fractional distillation, (3) passing the polymer rich in $C_5$ to $C_8$ olefins to a dehexenizer, (4) removing dehexenizer overheads from the polymer by fractional distillation, (5) passing the remaining polymer rich in $C_7$ to $C_8$ olefins to a deheptenizer, and (6) removing a substantially pure $C_7$ fraction from deheptenizer bottoms, the improvement therewith comprising the steps of isomerizing a feedstream comprising the dehexenizer overheads, the deheptenizer bottoms or mixtures thereof in the presence of a solid phosphoric acid catalyst, at a temperature of from 300 to 500° F., passing the isomerized feedstream to a distillation zone, and fractionally distilling to remove substantially pure heptenes, characterized as having a high degree of linearity.

2. A process according to claim 1 wherein the isomerization takes place at a pressure of between 100 and 1000 p.s.i.

3. A process according to claim 1 wherein the acidic catalyst is kieselguhr impregnated with phosphoric acid.

4. A process according to claim 1 wherein the olefin mixture is fed at a space velocity of between 0.1 and 2.0 U.S. gallons per hour per pound of catalyst, the catalyst being kieselguhr impregnated with phosphoric acid.

5. A process according to claim 1 wherein the catalyst comprises phosphoric acid and the olefin feed is charged with water vapour before contact with the catalyst.

6. A process according to claim 1 wherein the fractional distillation is carried out in two distillation towers and the isomerization product is fed to a tray near the middle of the first tower having 30 to 50 trays and being operated at a reflux ratio of between 3:1 and 5:1, and the bottoms products of the first tower is fed to the middle section of the second distillation tower which has 40 to 60 trays and is operated at a reflux ratio of between 3:1 and 5:1, and substantially pure heptenes are recovered as an overhead stream from the second distillation tower.

7. A process according to claim 1 wherein the olefin mixture comprises dehexenizer overheads from the polymerisation of a mixture of propylene, n-butylene and iso-butylene using a solid phosphoric acid catalyst.

8. A process according to claim 1 wherein the olefin mixture comprises deheptenizer bottoms from the polymerisation of a mixture of propylene, n-butylene, and iso-butylene using a solid phosphoric acid catalyst.

9. A process according to claim 1 wherein the olefin mixture comprises a blend of dehexenizer overheads and deheptenizer bottoms from the polymerisation of a mixture of propylene, n-butylene, and iso-butylene using a solid phosphoric acid catalyst.

10. A process according to claim 9 wherein said blend comprises about 60 wt. percent of the dehexenizer overheads, and about 40 wt. percent of deheptenizer bottoms.

References Cited

UNITED STATES PATENTS

| | | | |
|---|---|---|---|
| 2,228,131 | 1/1941 | Watson | 260—683.15 |
| 2,270,302 | 1/1942 | Ipatieff et al. | 260—683.15 |
| 2,388,942 | 11/1945 | Zimmerman | 260—683.2 X |
| 2,708,682 | 5/1955 | Dauber et al. | 260—683.15 |
| 3,255,273 | 6/1966 | Catterall | 260—683.15 |

PAUL M. COUGHLAN, Jr., Primary Examiner

U.S. Cl. X.R.

260—683.2